(12) United States Patent
Schneider et al.

(10) Patent No.: US 9,971,648 B1
(45) Date of Patent: May 15, 2018

(54) DYNAMIC PARITIES MECHANISM

(71) Applicant: EMC Corporation, Hopkinton, MA (US)

(72) Inventors: Zvi Schneider, Raanana (IL); Tal Ben-Moshe, Kiryat Ono (IL); Niko Farhi, Petach-Tikva (IL); Lior Kamran, Reshon Letzion (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 32 days.

(21) Appl. No.: 14/982,971

(22) Filed: Dec. 29, 2015

(51) Int. Cl.
  *G06F 11/10* (2006.01)
  *G06F 3/06* (2006.01)
(52) U.S. Cl.
  CPC ......... *G06F 11/1076* (2013.01); *G06F 3/064* (2013.01); *G06F 3/0619* (2013.01); *G06F 3/0689* (2013.01)
(58) Field of Classification Search
  CPC .... G06F 3/064; G06F 3/0689; G06F 11/1076; G06F 11/1084; G06F 11/1088; G06F 3/0619
  See application file for complete search history.

(56) References Cited

U.S. PATENT DOCUMENTS

| | | | |
|---|---|---|---|
| 8,370,688 B2* | 2/2013 | Mazina | G06F 11/0727 714/42 |
| 8,839,028 B1* | 9/2014 | Polia | G06F 11/1084 714/6.24 |
| 2013/0173955 A1* | 7/2013 | Hallak | G06F 11/1076 714/6.24 |

* cited by examiner

*Primary Examiner* — Shelly A Chase
(74) *Attorney, Agent, or Firm* — Krishnendu Gupta; Konrad R. Lee

(57) ABSTRACT

A system, computer program product, and computer-executable method of managing parity data of a Redundant Array of Independent Disks (RAID) on a data storage system, where the data storage system stores a first set of parity data and retains metadata associated with the first set of parity data, the system, computer program product, and computer-executable method including allocating a set of locations on the data storage system for a second set of parity data, processing the second set of parity data, and updating the metadata associated with the first set of parity data.

12 Claims, 10 Drawing Sheets

FIG. 2

| Data Disk 1 | Data Disk 2 | Data Disk 3 | Data Disk 4 | Data Disk 5 | Row Parity Disk | Diagonal Parity Disk |
|---|---|---|---|---|---|---|
| <1, 5> | <1, 6> | <1, 7> | <1, 8> | <1, 9> | ⊕1 | ⊕5 |
| <2, 6> | <2, 7> | <2, 8> | <2, 9> | <2, 5> | ⊕2 | ⊕6 |
| <3, 7> | <3, 8> | <3, 9> | <3, 5> | <3, 6> | ⊕3 | ⊕7 |
| <4, 8> | <4, 9> | <4, 5> | <4, 6> | <4, 7> | ⊕4 | ⊕8 |
| | | | | | | ⊕9 |

FIG. 3

DYNAMIC PARITIES MECHANISM

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data storage.

BACKGROUND

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

Companies that sell data storage systems are very concerned with providing customers with an efficient data storage solution that minimizes cost while meeting customer data storage needs. It would be beneficial for such companies to have a way for reducing the complexity of implementing data storage.

SUMMARY

A system, computer program product, and computer-executable method of managing parity data of a Redundant Array of Independent Disks (RAID) on a data storage system, where the data storage system stores a first set of parity data and retains metadata associated with the first set of parity data, the system, computer program product, and computer-executable method including allocating a set of locations on the data storage system for a second set of parity data, processing the second set of parity data, and updating the metadata associated with the first set of parity data.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

FIG. 2 is a block diagram showing a distribution of data blocks in the RAID 6 memory array of FIG. 1;

FIG. 3 is a schematic block diagram showing in greater detail the distribution of data blocks of FIG. 2;

Like reference symbols in the various drawings indicate like elements.

DETAILED DESCRIPTION

Traditionally, standard RAID 6 scheme implementations introduce an issue where a Raid system cannot atomically update parity information of a RAID 6 stripe. Generally, parity information can be partially overwritten, and upon failure the consistency of the stripe is compromised. Typically, overcoming this issue usually requires a transactional backup of the parity columns in disk or other kind of non-volatile (backup media) memory which requires additional resources depending on the backup media. Conventionally, improvements to the RAID 6 Scheme would be beneficial to the data storage industry.

In many embodiments, the current disclosure may enable a RAID system to implement a dynamic parity mechanism. In various embodiments, the current disclosure may enable a RAID system to maintain data consistency even while writing parity information. In certain embodiments, the current disclosure may enable efficient use of data storage within a RAID system. In some embodiments, the current disclosure may enable a RAID system to instantly recover from a failure related to writing parity information.

Redundant Array of Independent Disks (RAID) System

Figure 1:
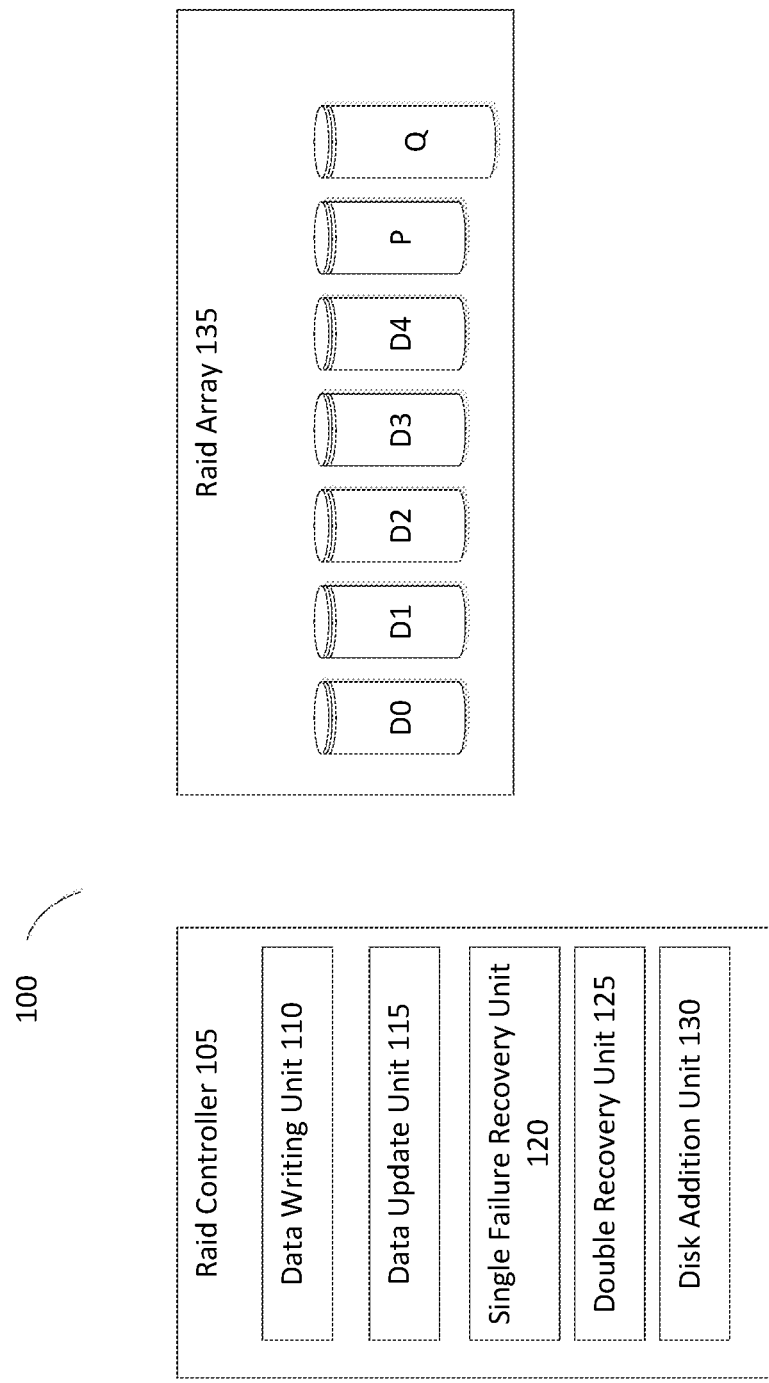
FIG. 1 is a simplified illustration of a redundant array of independent disk (RAID) system, in accordance with an embodiment of the present disclosure.

Refer to the example embodiment of FIG. 1. FIG. 1 is a simplified illustration of a redundant array of independent disk (RAID) system, in accordance with an embodiment of the present disclosure. RAID system 100 includes a controller 105 and an array 135 of data storage disks, in this example five data disks (D0-D4).

The controller 105 includes a data write unit 110 for writing initial data into the array, an update unit 115 for updating existing data in the array, a single failure recovery unit 120 for recovering data after a single disk failure, and a double failure recovery unit 125 for recovering data following concurrent failure of two disks. A disk addition unit 130 manages the addition of new disks to the system, either after failure of an existing disk or when it is desired to expand the system 100. The operation of each of these units is discussed in greater detail herein below.

Each of the disks in the array 135 stores a column of data blocks. The same data block in successive disks forms a row, which is to say the rows cross the disks. The data storage blocks are stored alongside parity data blocks in parity disks P and Q, and the number of data blocks in the different columns or disks are different. Row parity data is placed in row parity blocks in row parity column P. Diagonal parity data is placed in diagonal parity blocks in a diagonal parity column Q.

In the case of five data columns and four data rows, the numbers of diagonals is one greater than the number of rows. Hence the diagonal parity column Q comprises one more block than the other columns. More generally, as will be discussed below, the max number of data columns is a prime number, and the number of rows is one less than that prime number, creating the asymmetry discussed hereinabove. In practice the various columns are distributed over the physical disks available, so as not to cause system bottlenecks.

In many embodiments, an array may comprise a plurality of solid state drives (SSD) as opposed to magnetic disks. In various embodiments, SSDs may be random access, whereas magnetic disks may be mechanical devices with momentum. In certain embodiments, the magnetic disks may be most efficient where data readout may be largely serial and having uneven sizes of columns between stripes causes the magnetic disks to work inefficiently. In some embodiments, SSDs however may be solid state with no momentum issues and thus the present embodiments may be ideally suited to an array of SSD devices, or any other random access device.

In many embodiments, the number of data columns may equal a prime number and the number of data rows is one less than the number of data columns, to create an asymmetry that ensures that each column is absent from one of the diagonals.

In an embodiment, the number of data columns may be equal to a number of disks allowed in the array, which is the prime number referred to above. At any given time an actual number of disks present is less than or equal to the allowed number of disks, so that new disks can be added until that allowed number is reached. When a disk is added, data parity blocks need to be added to the new disk to keep the parity blocks, the p and q columns, evenly spread over the physical disks to avoid system bottlenecks. Hence the controller 105 comprises a disk addition unit 130 to manage the process of adding a disk to the array. In order to add a new disk to the array and maintain a balance of parity blocks over the array, the disk addition unit 130 migrates a row parity block to the new disk. However, in an embodiment, instead of actually writing data on the new disk, the unit in fact retains the row parity blocks at their original disk position and defines a zeroed block of data in the new disk to receive future parity updates for the selected row parity block. Because the original parity block is retained, zero is the current correct parity for the row, so that only updates from now onwards are needed and a resource consuming read and write is avoided. The disk addition unit copies a single diagonal parity block to the new disk since the addition of a new disk means there is a single old diagonal parity block that does not reside in the new diagonal parity group. The rest of the diagonal parity blocks are defined as zeroed blocks of data in an identical manner to the case described above for row parity blocks, because they can be placed in positions such that they are in the same parity group as the old diagonal parity blocks.

The controller 105 comprises a single-disk failure recovery unit 120. A basic embodiment recovers the data of the entire disk using row parity only or diagonal parity only. However a more efficient embodiment uses row parity to recover just some, typically half, or the lost data blocks and then switches to diagonal parity to recover the remaining data blocks. The switch to diagonal parity means that data blocks already read to recover row parity data can be reused and thus the entire disk can be recovered with considerably fewer read operations.

A double-disk failure recovery unit 125 is used to recover data following failure of two of the disks. The unit selects a first block for recovery from one of the disks, where the block's diagonal parity includes that block but does not include any blocks from the other missing column. The unit recovers this first block using the diagonal parity. The unit then recovers the block of the same row in the second missing disk using the row parity. The unit continues to alternate between diagonal and row parity until all the rows are recovered.

The data update unit 115 writes a new data block over an old data block. The data update unit reads the old data block, and existing parity data, then writes the new data block and XORs data of the old data block with data of the new data block and the existing parity data to form new parity data. There is no need to read the other data blocks in the same row or column since they remain unchanged, meaning their parity remains unchanged.

Now consider in greater detail, the present embodiments reduce system overheads at the expense of capacity. A block is added to contain the parity of the kth diagonal. This leads to the disadvantage of having columns which are different sizes, and thus disks which are different sizes. In fact the different sized disk problems can be avoided if the blocks are spread over disks in such a way as to provide no noticeable difference. Spreading over different disks has the added advantage of prevent bottleneck creation, as discussed with the existing schemes.

A Raid 6 scheme based on magnetic disks requires sequential disk actions and the absence of an even disk layout means that the tendency of disk actions to be sequential is lost. However when working with SSDs which are much more random access, data access can be in any desired sequence without any issue of mechanical inertia.

An SSD is a data storage device that uses solid-state memory to store persistent data with the intention of providing access in the same manner of a traditional block I/O hard disk drive. SSDs are distinguished from traditional hard drives (HDDs), which are electromechanical devices containing spinning disks and movable read/write heads. In contrast, SSDs use microchips which retain data in non-volatile memory chips and contain no moving parts. Compared to electromechanical HDDs, SSDs are typically less susceptible to physical shock, are silent, have lower access time and latency, but are many times more expensive per gigabyte (GB). SSDs use the same interface as hard disk drives, thus easily replacing them in most applications.

At present, SSDs use NAND-based flash memory, which retains memory even without power. SSDs using volatile random-access memory (RAM) also exist for situations which require even faster access, but do not necessarily need data persistence after power loss, or use external power or batteries to maintain the data after power is removed.

The scheme present being outlined also requires more space for redundancy than other RAID 6 schemes. For example, in an embodiment, let K represent a number of total number of data disks within a RAID 6 Scheme. As K gets larger, the additional overhead gets smaller so that this particular disadvantage is manageable.

Figure 2:
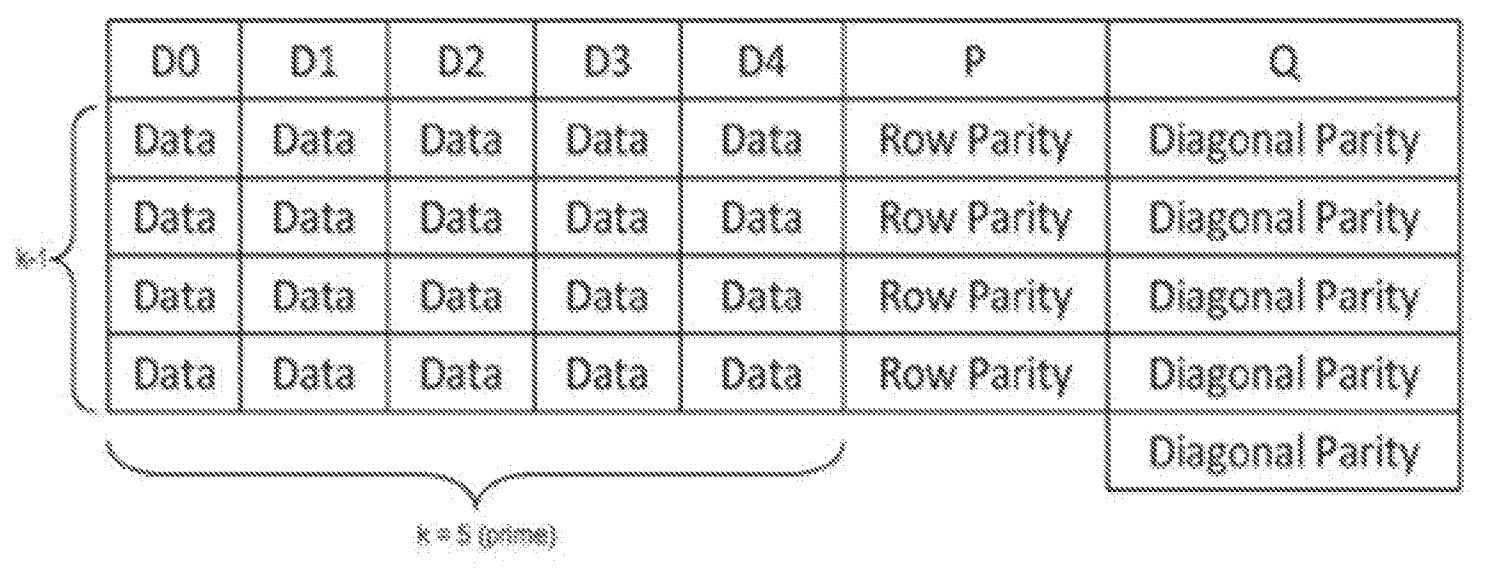

Refer to the example embodiment of FIG. 2, which is a simplified schematic diagram of the present embodiment, in the case shown, k is 5, a prime number, and there are five columns, (D0-D4). There are four rows (k-1). The P column consists of the same four rows but the Q column has an extra row.

The block size may be defined as 4K. The same scheme is shown in FIG. 3, in which the individual data blocks are defined. FIG. 3 shows which parity blocks are associated with each respective data block. For example, in this embodiment, the block showing <1, 5> may be recovered using parity disk block ⊕1 or ⊕5 XOR'd with every other data block referencing either ⊕1 or ⊕5.

The variable depth RAID scheme of the present embodiments simply adds an extra block to deal with the extra diagonal. Each stripe contains k (k must be prime) data columns, and two parity columns P and Q. The stripe is composed of a quasi-matrix of blocks, which contains k-1 rows. Column P contains K-1 blocks, each consisting of the parity of the K data disk blocks in its row. The K by K-1 matrix made up of the blocks in the data columns contains K diagonals, each of size k-1. Column Q, in contrast with the rest of the columns, contains k blocks and not k-1. Each of the k blocks in disk Q holds the parity of one of the diagonals.

It should be noted that the ordering of the blocks within each column may be arbitrary. Furthermore, the extra block in column Q may be placed in a data column which does not contain a data block in the diagonal of which this block is the parity. Some of the rows may be blank.

The resulting code is optimal under nearly all operations with respect to I/Os and computations, excluding the reads needed to rebuild a disk after one failure. The rebuild overhead after one disk failure can be brought down to a bit more than 3K/4 reads, midway between the optimal of k/2 and the k reads needed by Even/Odd and RDP. The extra block causes the capacity overhead to grow slightly, but this overhead of $1/(K^2-K)$ can be made as small as required by increasing K. Another problem this extra block may pose is that Q is larger than the rest of the columns. This is easily fixed by using a configuration where the parity columns of each stripe are balanced across the various disks. This configuration balances both I/Os and capacity utilization between the physical disks.

More information regarding RAID implementations may be found in U.S. Pat. No. 8,990,495 entitled "Secure data storage in RAID Memory Devices" which is commonly assigned herewith and incorporated by reference herein.

Dynamic Parity Mechanism

In many embodiments, a dynamic parities mechanism may enable a RAID system to maintain data consistency while updating parity information. In various embodiments, a dynamic parities mechanism may enable a RAID system to prevent overwriting existing parities while there may still be a possibility of failure. In most embodiments, a dynamic parities mechanism within a RAID system may enable writing new and/or updated parity information to a new location. In various embodiments, a dynamic parities mechanism may be enabled to verify that parity information has been written and, only after successfully verifying parity information, a RAID system may be enabled to update the stripe data and/or metadata associated with the striped data and parity information.

In most embodiments, a dynamic parity mechanism may reserve various amounts of storage on each parity disk. In certain embodiments, reserved amounts of storage on each parity disk may enable a RAID system handle writes in parallel more efficiently. In various embodiments, a user and/or administrator may be enabled to configure a RAID system to utilize a dynamic parity mechanism. In some embodiments, based on user and/or administrator configuration, a RAID system may be enabled to support a specified number (one or a plurality) of parallel writes to the RAID system. In some embodiments, an amount of data storage resources reserved may correlate to the number of writes requested to be supported and/or stripe column size.

In many embodiments, a dynamic parity mechanism may reserve a set amount of data storage for managing parity data writes. In various embodiments, upon receive a write and/or update request, a dynamic parity mechanism may allocate a free column from reserved parity columns on a specified parity disk. In certain embodiments, a RAID system may create parity data and write the parity data to the allocated free column. In other embodiments, upon completion of writing parity data, a RAID system may verify written parity data. In some embodiments, upon completion of writing parity data, a RAID system may write the received data to the data pages/disks. In certain embodiments, a RAID system may update metadata associated with the parity data written to the free column such that the parity data in the free column is the currently used parity data for the RAID system. In other embodiments, upon completion of writing parity information and data, the dynamic parity mechanism frees the previously used parity information and returns the parity column to being a free parity column that may be enabled to be used in the future for other updates to the RAID system.

In most embodiments, order between write of parities and data may be enforced, such that new parities may be written first. In various embodiments, after new parities may be written, new parity positions and handles to the new data are kept in persistence.

Figure 4A:
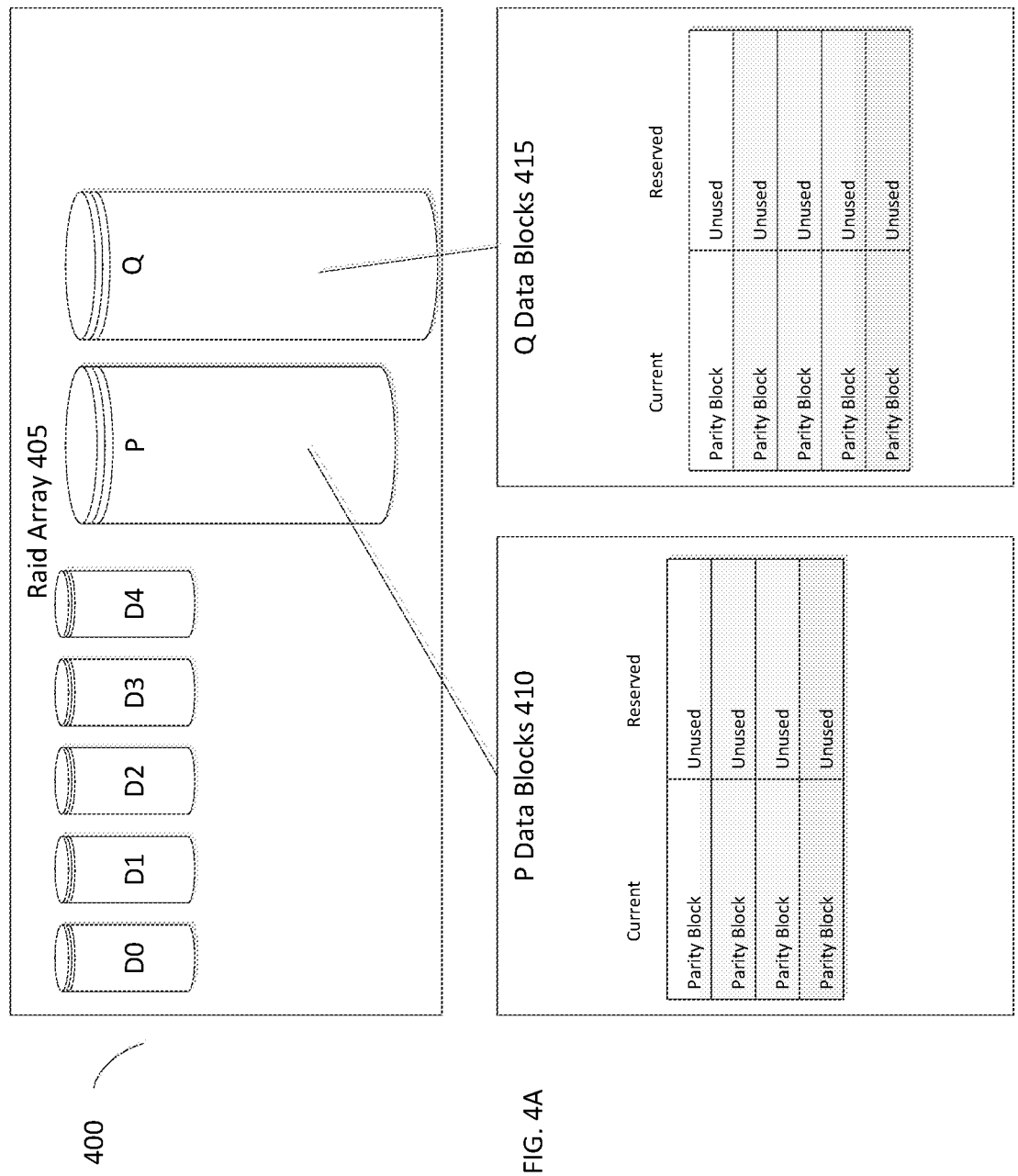
FIGS. 4A-4C are simplified illustrations of state diagrams of a RAID system implementing a dynamic parity mechanism, in accordance with an embodiment of the present disclosure.
Figure 4B:
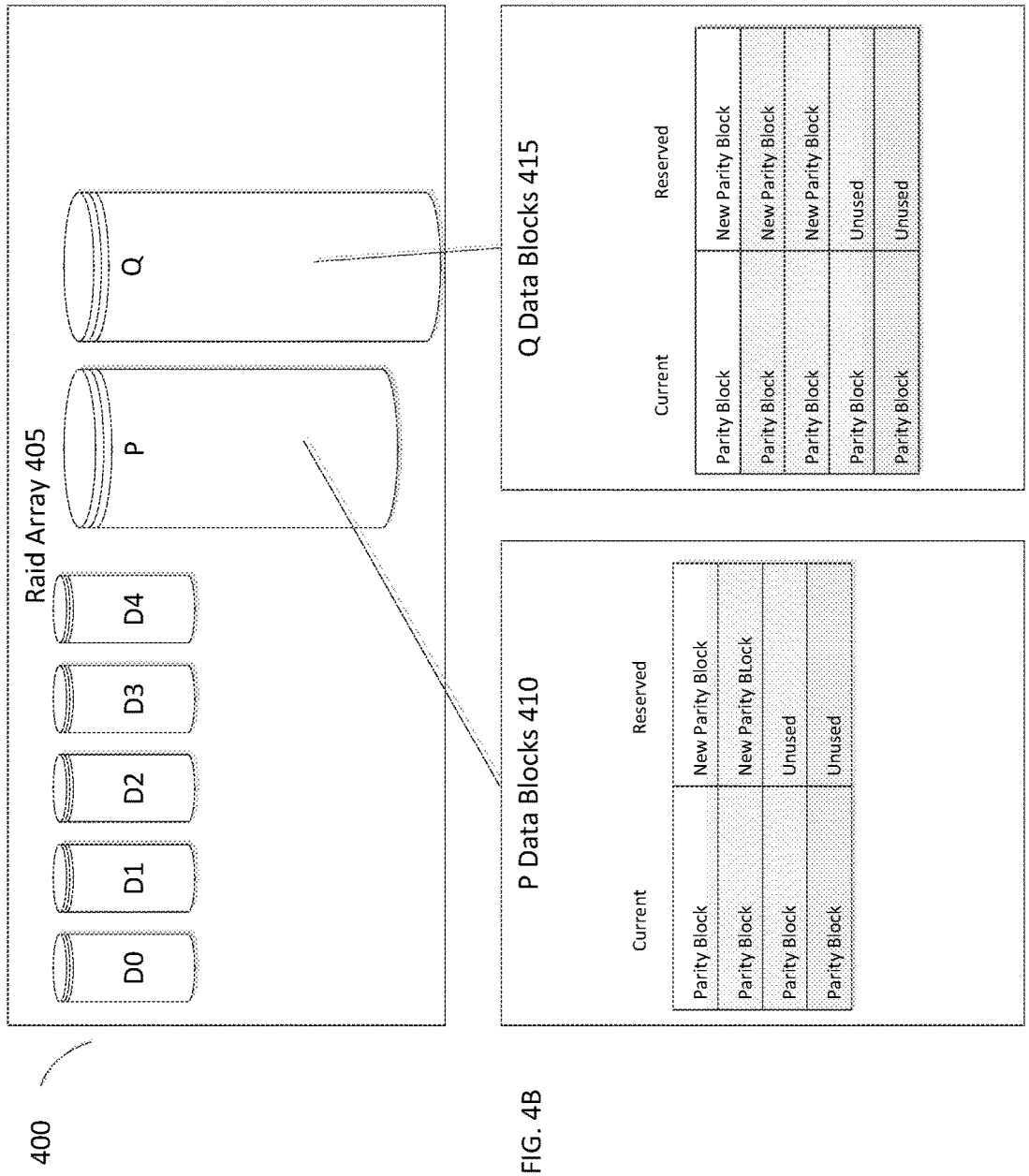
Figure 4C:
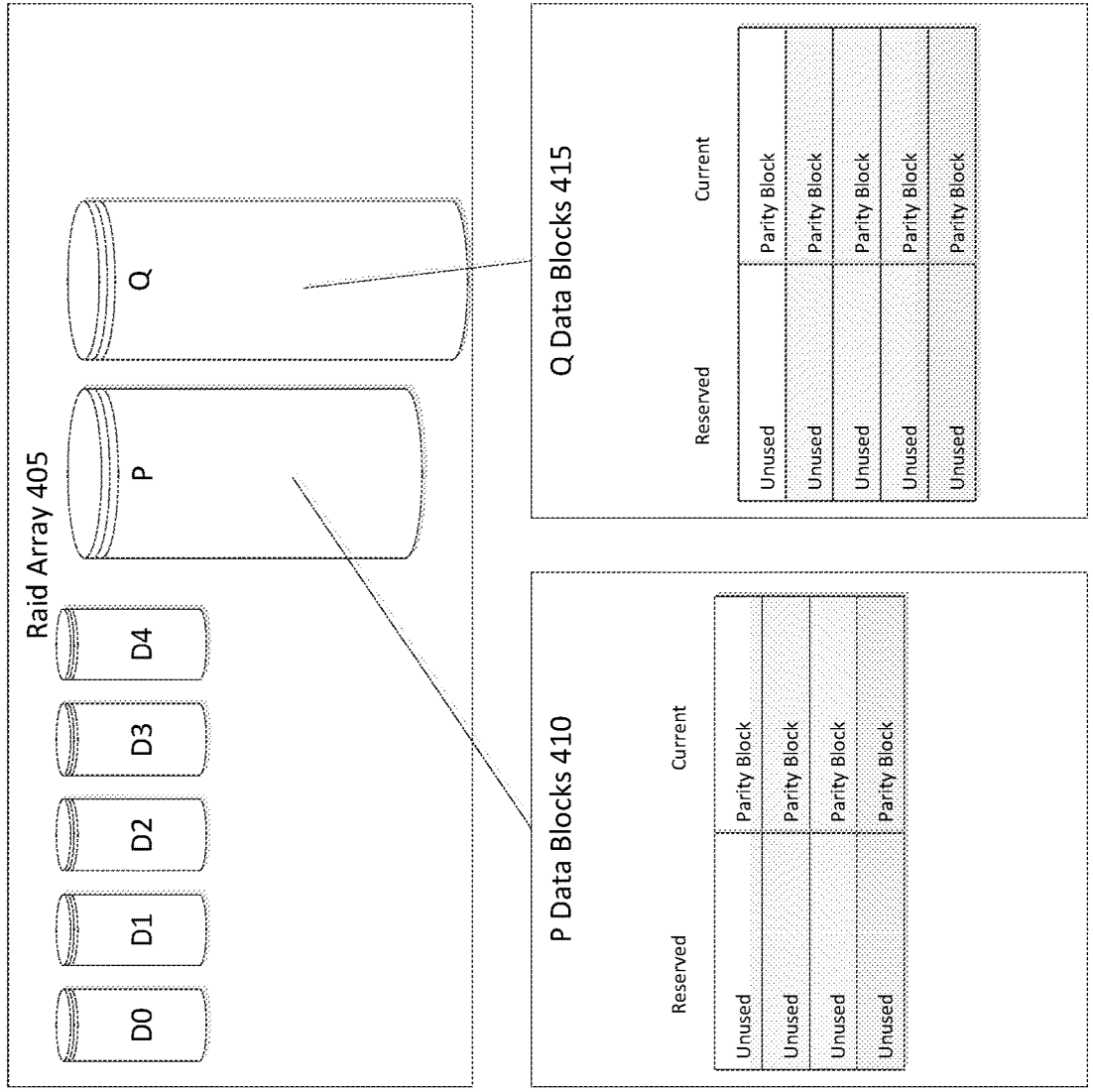

Refer to the example embodiments of FIGS. 4A-4C. FIGS. 4A-4C are simplified illustrations of state diagrams of a RAID system implementing a dynamic parity mechanism, in accordance with an embodiment of the present disclosure.

FIG. 4A shows a first state of a Raid Array 405 within Raid System 400. Raid array 405 includes data disks D0 through D4, row parity disk P, and diagonal parity disk Q. In this state, P Data blocks 410 shows parity blocks currently stored on row parity disk P and reserved data storage for updates to parity blocks. Q data blocks 415 shows parity blocks currently stored on diagonal parity disk Q and reserved data storage for updates to parity blocks on Q data blocks 415.

FIG. 4B shows a second state of the Raid Array 405 within Raid system 400. In this state, Raid system 400 has received updates to data stored within Raid Array 405. Raid System 400 is currently updating parity blocks on row parity disk P and diagonal parity disk Q. As shown within P Data Blocks 410 and Q data blocks 415, raid system 400 has initiated updating parity blocks. Raid system 400 has allocated space from the reserved data storage within P Data Blocks 410 and begun updating the reserved data storage with the new parity blocks. Raid system 400 has allocated space from the reserved data storage within Q data blocks 415 and begun updating the reserved data storage within the new parity blocks.

FIG. 4C shows a third state of the Raid Array 405 within Raid system 400. Raid system 400 is in process of completing an update of parity blocks on row parity disk P and diagonal parity disk Q. As shown within P data blocks 410 and Q data blocks 415, raid system 400 has completed updating the previously reserved data storage and transitioned those blocks to the currently used parity blocks. In this embodiment, RAID system 400 has deleted the previously current parity blocks and returned the deleted blocks to reserved data storage for future updates of parity blocks in either P data blocks 410 or Q data blocks 415.

Figure 5:
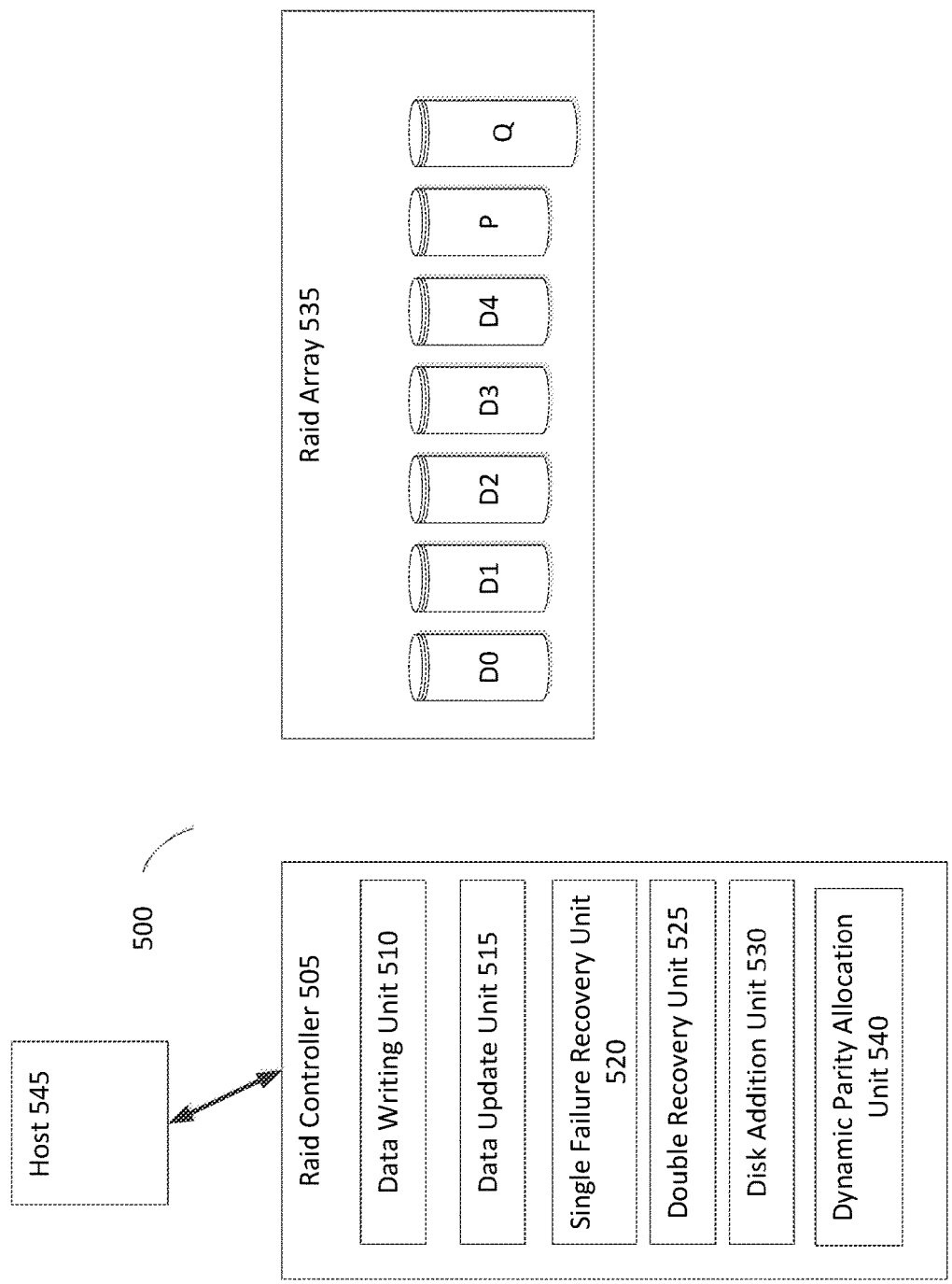
FIG. 5 is a simplified illustration of a Raid system managing parity data, in accordance with an embodiment of the present disclosure.

Refer to the example embodiment of FIG. 5. FIG. 5 is a simplified illustration of a Raid system managing parity data, in accordance with an embodiment of the present disclosure. Raid system 500 includes raid controller 505 and raid array 535. Raid controller 505 includes data writing unit 510, data update unit 515, single failure recovery unit 520, double recovery unit 525, disk addition unit 530, and dynamic parity allocation unit 540. Data writing unit 510 handles initial writes to into raid array 535. Data update unit 515 handles updates to data stored within raid array 535. Data update unit 515 utilizes dynamic parity allocation unit 540 to manage updates of parity data on parity disks P and Q. Single failure recovery unit 520 handles recovering data after a single disk failure. Double recovery unit 525 handles recovering data following concurrent failure of two disks. Disk Addition unit 530 manages the addition of new disks to raid system 500, either during replacement of one or the data storage disks of RAID array 535 or when expanding the capacity of raid array 535. Raid array 535 includes data storage disks D0-D4 and Data storage for parity data in parity disks P and Q. In this embodiment, parity disk P stores row parity data and parity disk Q stores diagonal parity data.

Figure 6:
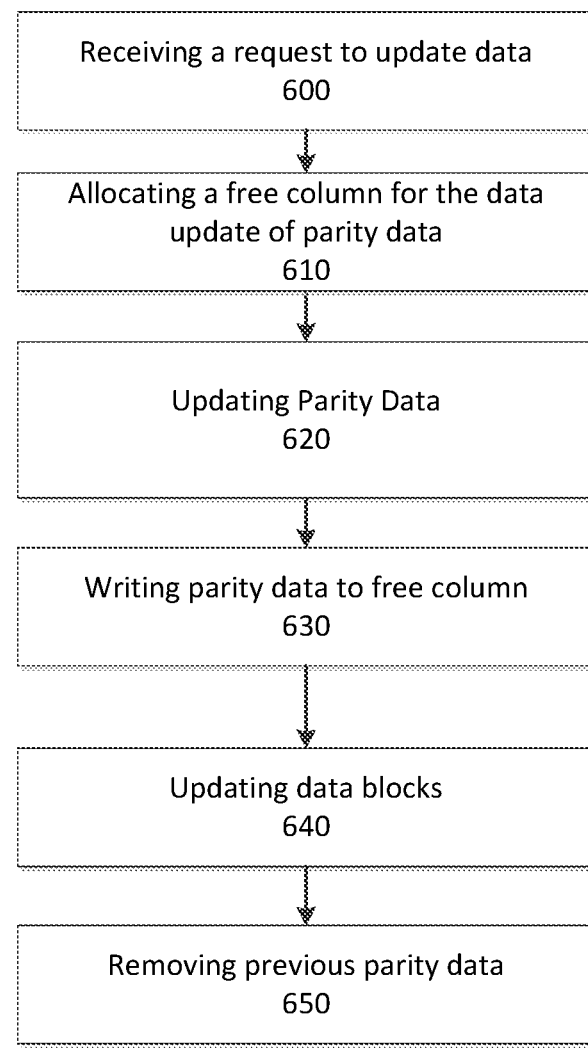
FIG. 6 is a simplified flowchart of a method of updating parity data in a RAID system as shown in FIG. 5, in accordance with an embodiment of the present disclosure.

Refer to the example embodiments of FIGS. 5 and 6. FIG. 6 is a simplified flowchart of a method of updating parity data in a RAID system as shown in FIG. 5, in accordance with an embodiment of the present disclosure. In FIG. 5, Raid system 500 includes raid controller 505 and raid array 535. Raid controller 505 includes data writing unit 510, data update unit 515, single failure recovery unit 520, double recovery unit 525, disk addition unit 530, and dynamic parity allocation unit 540. Raid array 535 includes data storage disks D0-D4 and Data storage for parity data in parity disks P and Q. Raid system 500 is enabled to communicate with Host 545. In many embodiments, a host may be used to execute one or more applications and may be enabled to store associated data within a RAID system.

As shown in FIG. 5, Raid system 500 receives a request to update data from Host 545 (Step 600). RAID system 500 uses data update unit 515 to process the update data request. Data update unit 515 utilizes dynamic parity allocation unit 540 to allocate a free parity column in parity disk P and parity disk Q (Step 610). Data update unit 515 updates the allocated parity columns with parity data on parity disk P and parity disk Q (Step 620). once data update unit 515 completes writing parity data, data update unit 515 verifies the parity data written. Upon verification, data update unit 515 updates the RAID array 535 with data from the received update data request (Step 640) and updates metadata associated with the data and parity data written, such that the metadata points to the updated parity data. Dynamic Parity allocation unit 540 removes the previous parity data and recovers the data storage (Step 650). Upon recovering the data storage, dynamic parity allocation unit 540 returns the recovered data storage to the reserved data storage for parity data updates.

General

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium.

Figure 7:
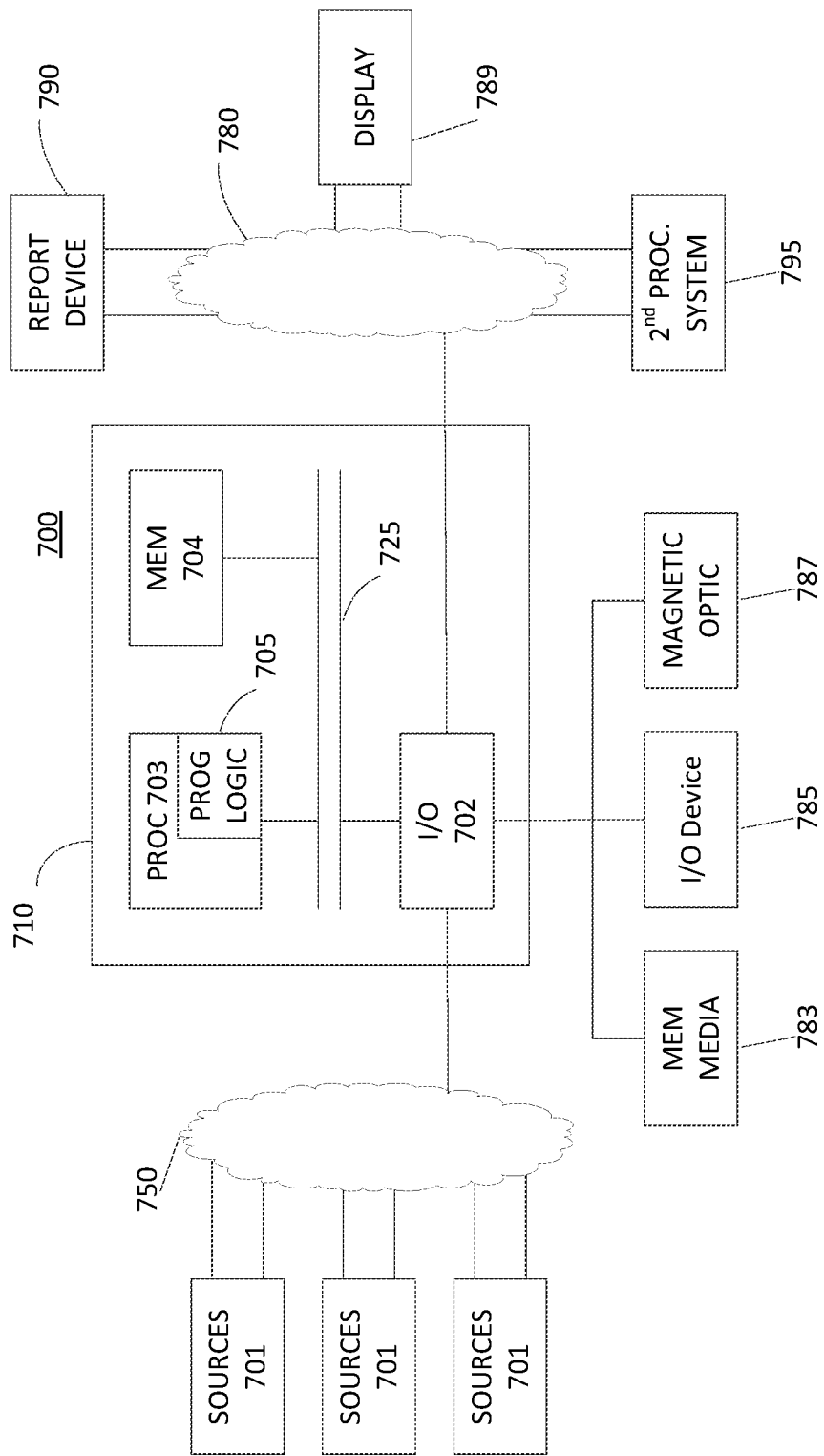
FIG. 7 is an example of an embodiment of an apparatus that may utilize the techniques described herein, in accordance with an embodiment of the present disclosure.

FIG. 7 is a block diagram illustrating an apparatus, such as a computer 710 in a network 700, which may utilize the techniques described herein according to an example embodiment of the present invention. The computer 710 may include one or more I/O ports 702, a processor 703, and memory 704, all of which may be connected by an interconnect 725, such as a bus. Processor 703 may include program logic 705. The I/O port 702 may provide connectivity to memory media 783, I/O devices 785, and drives 787, such as magnetic drives, optical drives, or Solid State Drives (SSD). When the program code is loaded into memory 704 and executed by the computer 710, the machine becomes an apparatus for practicing the invention. When implemented on one or more general-purpose processors 703, the program code combines with such a processor to provide a unique apparatus that operates analogously to specific logic circuits. As such, a general purpose digital machine can be transformed into a special purpose digital machine.

Figure 8:
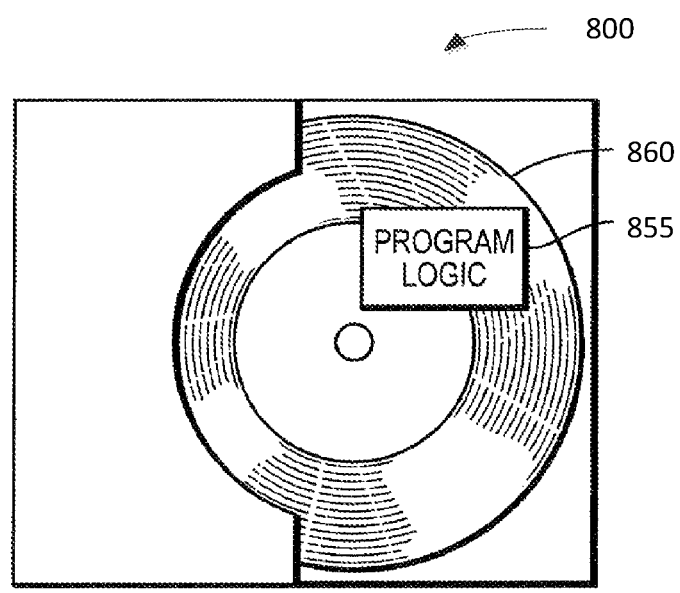
FIG. 8 is an example of a method embodied on a computer readable storage medium that may utilize the techniques described herein, in accordance with an embodiment of the present disclosure.

FIG. 8 is a block diagram illustrating a method embodied on a computer readable storage medium 860 that may utilize the techniques described herein according to an example embodiment of the present invention. FIG. 8 shows Program Logic 855 embodied on a computer-readable medium 860 as shown, and wherein the Logic is encoded in computer-executable code configured for carrying out the methods of this invention and thereby forming a Computer Program Product 800. Program Logic 855 may be the same logic 705 on memory 704 loaded on processor 703 in FIG. 7. The program logic may be embodied in software modules, as modules, as hardware modules, or on virtual machines.

The logic for carrying out the method may be embodied as part of the aforementioned system, which is useful for carrying out a method described with reference to embodiments shown in, for example, FIGS. 1-8. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A computer-executable method of managing parity data of a Redundant Array of Independent Disks (RAID) on a data storage system, where the data storage system stores a first set of parity data and retains metadata associated with the first set of parity data, the computer-executable method comprising:
   allocating a set of locations on the data storage system for a second set of parity data;
   processing the second set of parity data; and
   updating the metadata associated with the first set of parity data, wherein updating the metadata comprises modifying the metadata associated with the first set of parity to be associated with the second set of parity data, wherein the metadata now corresponds to the second set of parity data.

2. The computer-executable method of claim 1, wherein processing the second set of parity data comprises writing the second set of parity data to the set of locations on the data storage system.

3. The computer-executable method of claim 2, wherein the set of locations on the data storage system differ from the location of the first set of parity data.

4. The computer-executable method of claim 1, further comprising removing the first set of parity data.

5. A system, comprising:
 a data storage system implementing a Redundant Array of Independent Disks (RAID), wherein the data storage system stores a first set of parity data and retains metadata associated with the first set of parity data; and
 computer-executable program logic encoded in memory of one or more computers enabled to manage parity data on the data storage system, wherein the computer-executable program logic is configured for the execution of:
 allocating a set of locations on the data storage system for a second set of parity data;
 processing the second set of parity data; and
 updating the metadata associated with the first set of parity data, wherein updating the metadata comprises modifying the metadata associated with the first set of parity to be associated with the second set of parity data, wherein the metadata now corresponds to the second set of parity data.

6. The system of claim 5, wherein processing the second set of parity data comprises writing the second set of parity data to the set of locations on the data storage system.

7. The system of claim 6, wherein the set of locations on the data storage system differ from the location of the first set of parity data.

8. The system of claim 5, wherein the computer-executable program logic is further configured for the execution of removing the first set of parity data.

9. A computer program product for managing parity data of a Redundant Array of Independent Disks (RAID) on a data storage system, where the data storage system stores a first set of parity data and retains metadata associated with the first set of parity data, the computer program product comprising:
 a non-transitory computer readable medium encoded with computer-executable code, the code configured to enable the execution of:
 allocating a set of locations on the data storage system for a second set of parity data;
 processing the second set of parity data; and
 updating the metadata associated with the first set of parity data, wherein updating the metadata comprises modifying the metadata associated with the first set of parity to be associated with the second set of parity data, wherein the metadata now corresponds to the second set of parity data.

10. The computer program product of claim 9, wherein processing the second set of parity data comprises writing, the second set of parity data to the set of locations on the data storage system.

11. The computer program product of claim 10, wherein the set of locations on the data storage system differ from the location of the first set of parity data.

12. The computer program product of claim 9, wherein the code is further configured to enable the execution of removing the first set of parity data.

* * * * *